INVENTOR.
ARTHUR T. STARR
PETER F.T.C. STILLWELL
BY

ATTORNEY 3,340,419
ELECTRIC DISCHARGE TUBES
Arthur Tisso Starr, New Barnet, and Peter Frederic Thomas Cryer Stillwell, Aldershot, England, assignors to Rank Precision Industries Limited, London, England, a corporation of Great Britain
Filed Apr. 15, 1964, Ser. No. 360,047
3 Claims. (Cl. 315—13)

This invention relates to electric discharge tubes, more particularly, to apparatus and methods for producing a predetermined pattern of electron beams therein.

It has been proposed in copending patent applications Ser. No. 104,916, filed Apr. 24, 1961, now U.S. Patent No. 3,198,976, which issued Aug. 3, 1965, and U.S. patent application, Ser. No. 259,451, filed Feb. 18, 1963, to provide an electric discharge tube in the form of an image-forming cathode ray tube in which a number of elemental electron beams are produced by using a number of apertures in a plate interposed in the path of the beams for selectively switching the elemental electron beams under the control of input signals, using the apertures as controlled electrodes. However, since it is desirable to keep the maximum diameter of an image forming beam as small as possible, this involves the construction of a very small aperture plate with switchable electrodes. Therefore, elimination of the criticality imposed by the need for very small aperture plates with switchable electrodes is an object of the present invention.

Improved apparatus and methods for the display of alphanumeric character symbols is another object of the present invention.

Improved apparatus and methods for producing a plurality of elemental beams in an electric discharge tube in a predetermined pattern under the control of input signals is also an object of the preesnt invention.

Further objects of the present invention will be apparent to those skilled in the art from a reading of the specification and claims thereof.

According to one embodiment of the present invention there is provided an electric discharge tube, having a matrix array comprising a plurality of elemental areas of emitting source, each of said elemental areas of emitting source being electrically distinct and separately controllable from outside the tube envelope.

According to another embodiment of the present invention there is provided a method of producing a plurality of elemental beams in an electric discharge tube in a predetermined pattern under the control of input signals, comprising the steps of selectively producing elemental beams from electrically distinct elemental areas of emitting source and switching said elemental beams by varying the potential applied to each of said electrical areas of emitting source in accordance with input signals.

Embodiments of electric discharge tubes according to the present invention will now be particularly described hereinafter with reference to the accompanying drawings, in which.

Figure 1:
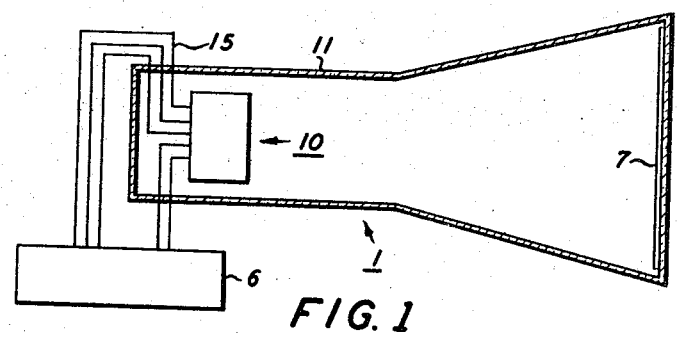
FIG. 1 illustrates a cathode ray tube having a matrix array according to the present invention.

FIG. 1 illustrates a cathode ray tube 1 having an envelope 11, fluorescent screen 7, and a matrix array 10 (described in detail in connection with FIGS. 2 and 3) situated in the neck portion of envelope 11. As schematically illustrated, matrix array 10 is connected to a source of electrical input signals generally designated by reference numeral 6.

Figure 2:
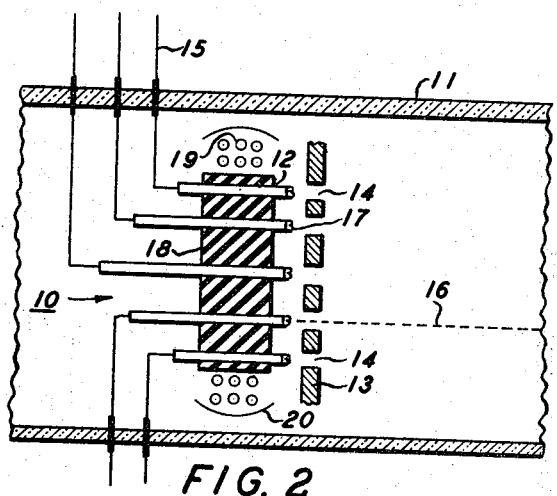
FIG. 2 is a fragmentary sectional elevation, in diagrammatic form, showing in detail the matrix array situated in the neck portion of a cathode ray tube; and, FIG. 3 similarly illustrates an alternative embodiment of the present invention incorporating input leads which pass through an insulator block.

Referring to FIG. 2 of the drawing, there is shown matrix array 10 as situated in the neck portion of the envelope 11 of an electric discharge tube according to the present invention. The matrix array 10 includes a number of cathodes 12 as elemental areas of electron emitting source, which cathodes 12 face a modulator plate 13 containing an equal number of apertures 14, each aperture being in register with one of the cathodes 12. Each of the cathodes 12 has an input lead 15 through the tube envelope 11, and each cathode 12 can be selectively rendered active or inactive by driving its lead by a suitable electrical potential. By thus activating predetermined cathodes, electron beams are made to impinge on fluoeelctrical potentiay. By thus activating predetermined pattern to form, for example, a bright display of alphanumeric character symbols.

In operation, the modulator plate 13 of the tube is held at a potential negative with respect to an inactive cathode 12, and by applying a suitable negative potential to a cathode 12 in the usual manner an elemental beam 16 may be produced.

The cathodes 12 consist of pins of metal, and on the tip of each pin is deposited a small coating 17 of emissive material, that is, a material which emits electrons when heated. The cathodes 12 are mounted in a block 18 of ceramic or other insulating material, and the whole of the ceramic insulator block 18 containing the cathodes 12 is surrounded by a heating coil 19 which is supplied in the usual manner from a low-voltage electrical supply. The heating coil 19 is in tube surrounded by heat shield 20 in order to conserve the amount of power required to keep the cathodes 12 at the appropriate temperature.

Figure 3:
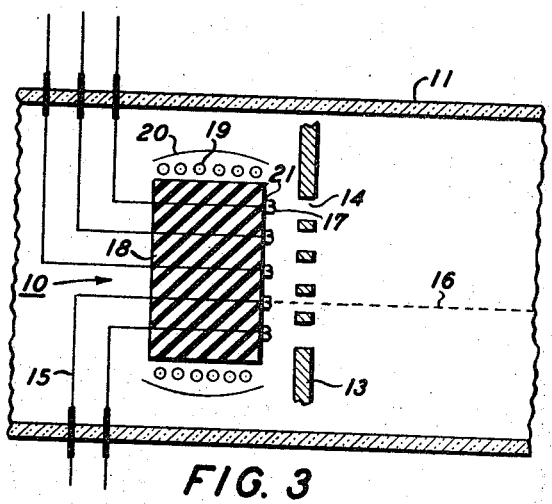

Referring to FIG. 3 of the drawing, there is shown an alternate structure of a matrix array 10 similar to the one described hereinabove with reference to FIG. 2, with the exception that the cathodes in this embodiment comprise small metallic elements 21 provided at the end of each input lead 15, and each of the input leads 15 passes through the entire thickness of the ceramic insulator block 18. The emitting material 17 is deposited upon the metallic elements 21 which in turn are deposited on the ceramic insulator block 18 and are connected to the tips of the input leads 15, so that each elemental area of emitting source 17 is connected to a fine wire 15 which traverses the ceramic insulator block 18 and is led out through the tube envelope 11. Thus, because of the absence of any large areas of metal, this embodiment is particularly characterized by reduced heat loss.

It will be appreciated that other embodiments of an electric discharge tube according to the present invention may be provided. For example, instead of the cathodes 12 comprising solid pins, small tubes having emissive material internally on their bores may be employed, or small gauge cathodes may be provided at the end of each of the input leads 15. Also the modulator plate 13 may take other forms, possibly without having an aperture of each elementary cathode.

What is claimed is:

1. A matrix array for producing electron beams in spatial arrangement determinable by input signals in an electric discharge tube, said matrix array comprising:
   a plurality of electrically separate electron generators including metal pins having deposited on the tips thereof electron emissive material responsive to heat and an electrically energizable heating coil surrounding said metal pins;
   modulator means for forming a plurality of elemental beams of electrons emitted from said generators;

heat conserving means surrounding said generators; and, connecting means for electrically connecting said electron generators to separate electrical activation sources whereby said generators may be selectively rendered active or inactive.

2. Apparatus according to claim 1 in which said modulator means comprises a metallic plate having a number of apertures equal to the number of said generators.

3. Apparatus according to claim 2 in which said apertures of said modulator means are in register with said generators.

References Cited

UNITED STATES PATENTS

| 2,585,582 | 2/1952 | Pierce | 313—338 |
| 3,143,685 | 8/1964 | Glyptis | 315—15 |

JOHN W. CALDWELL, *Acting Primary Examiner.*

DAVID G. REDINBAUGH, *Examiner.*

T. A. GALLAGHER, J. A. O'BRIEN,
*Assistant Examiners.*